W. H. PHELPS
Horse-Power.

No. 204,602. Patented June 4, 1878.

WITNESSES:
W. W. Hollingsworth
Chas. A. Pettit

INVENTOR:
Wm. H. Phelps
BY
ATTORNEYS.

N. PETERS, PHOTO-LITHOGRAPHER, WASHINGTON, D. C.

UNITED STATES PATENT OFFICE.

WILLIAM H. PHELPS, OF GREENVILLE, GEORGIA.

IMPROVEMENT IN HORSE-POWERS.

Specification forming part of Letters Patent No. 204,602, dated June 4, 1878; application filed May 18, 1878.

*To all whom it may concern:*

Be it known that I, WILLIAM H. PHELPS, of Greenville, in the county of Meriwether and State of Georgia, have invented a new and Improved Horse-Power; and I do hereby declare that the following is a full, clear, and exact description of the same.

My invention has for its object to provide an improved horse-power of the class of such as are dismounted from a wagon and used for threshing-machines, drag-saws, clover-hullers, corn-shellers, &c.

The object aimed at is to attain maximum power and speed with minimum length of sweep or lever, together with the greatest compactness of parts.

The construction and arrangement of parts are shown in accompanying drawing, in which—

Figure 1:
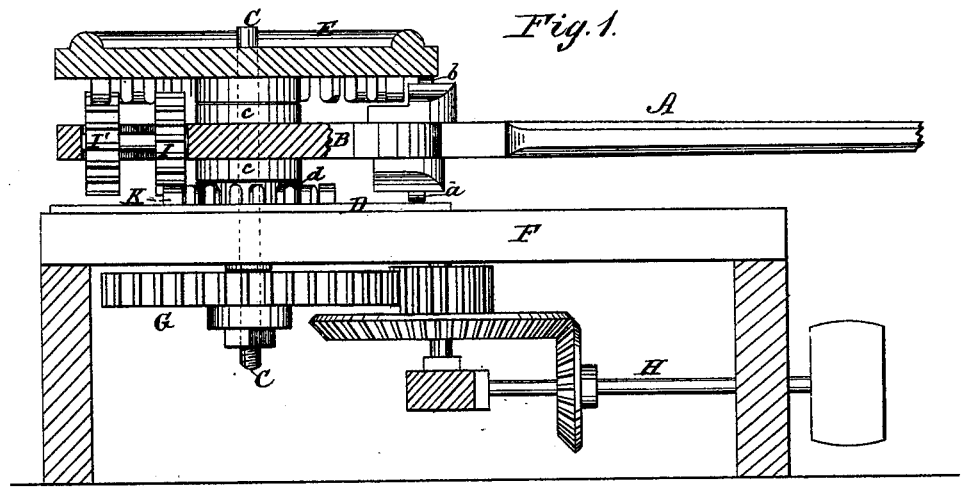
Figure 2:
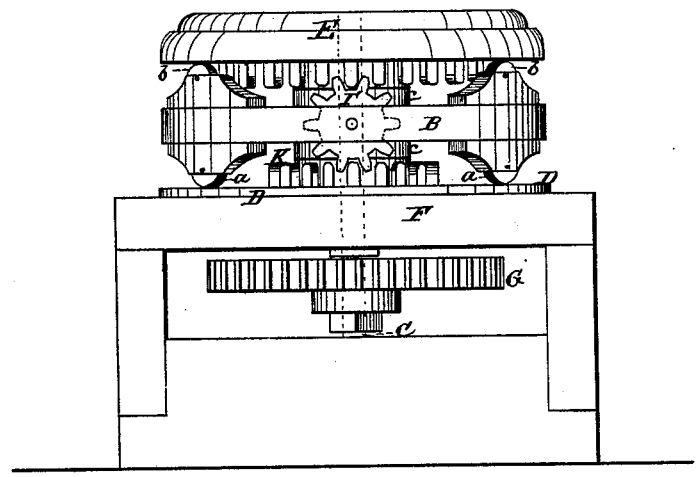

Figure 1 is partly sectional elevation of my improved horse-power. Fig. 2 is an end elevation.

The horizontal sweep or lever A, to which the draft animal is attached, in practice, is fitted in a socket of a circular plate, B, rotating on the axis C. Said plate is provided on the under side with friction-rollers $a$, that travel on a circular track, D, and on the upper side with rollers $b$, on which rests the crown-wheel E. The axis C passes through the hub $c$ of plate B, and through a suitable bearing, $d$, fixed in the platform F.

The upper or crown wheel E and lower spur-gear G, located below the platform F, are keyed on said axis, so as to revolve with it, while the plate B is loose thereon, and has independent motion.

The gear G communicates motion to the driving-shaft H through the medium of suitable intermediate gearing.

The circular plate B constitutes practically part of the lever A, of which the axis C is the fulcrum. This lever A B is put in working relation with the crown-wheel E by means of pinions I I′, having their bearings in slots in said plate B on the side opposite that where the lever proper A is attached. One of said pinions, I, meshes with a circular row of teeth, K, set in the platform F concentric with the axis C, and the other pinion, I′, meshes with the teeth of the crown-wheel E. Hence the rotation of the latter, and through it the rotation of the axis C and gear G and the derived motion imparted to the driving-shaft H, obviously depend on the action of the pinions I I′.

From the foregoing description it will be seen that the crown-wheel E and spur-gear G revolve simultaneously and in the same direction with the plate B, but at a higher speed, so that a greater number of revolutions is communicated to the driving-shaft H by one circuit of the draft animal than would be practicable if the lever A were attached directly to the crown-wheel E; and, further, it is obvious that the diameter of the path traveled by the draft animal is less by the length of the radius of the plate B than it would require to be in order to produce a like effect with the same power if the pinions I I′ were arranged on the side of the axis C next the inner end of lever A.

In other words, by placing the pinions on the other side of the fulcrum C—*i, e.*, on the side opposite the lever A—I practically lessen the diameter of the path required to be traveled by the draft animal, since by so doing I am enabled to reduce the length of the projecting lever by the radial distance between the axis C and the teeth of the crown-wheel E.

In other words, the prizing-lever A, acting on the center-shaft C as a fulcrum, the traveling-pinions I I′ represent the weight to be moved. I have thus a lever of the first class. In other powers the weight or force to be applied is between the center-shaft and the horse or power applied, while in my power the draft is beyond the center-shaft or fulcrum of the lever, so that with a lever of the usual length from the center—that is to say, fifteen feet—the weight to be moved or force required to be exerted is one foot from center or one foot beyond the fulcrum C, thus giving me a prizing-lever whose longer arm is fifteen feet and its shorter arm one foot, which is a ratio of sixteen to one as between the power and weight. If the pinions I I′ were on the other side of the shaft C and located one foot from the latter, the ratio would be fourteen to one.

The ultimate result may be expressed thus: With a comparatively short circuit or path for the draft animal, I attain a comparatively high rate of speed of the driving-shaft without the expenditure of the usual force required for the purpose in other powers of this class.

What I claim is—

In a horse-power of the class hereinbefore described, the combination of the crown-wheel E and spur-gear G fixed on the axis C, the lever A and plate B, connected as described, and the latter revolving loose on said axis, the pinions I I', arranged on the side of the axis opposite the lever, and the fixed row of teeth K, all as shown and described, for the purpose specified.

WILLIAM H. PHELPS.

Witnesses:
A. J. HEINTON,
D. R. KEITH.